(12) United States Patent
Vankamamidi et al.

(10) Patent No.: US 11,675,514 B2
(45) Date of Patent: Jun. 13, 2023

(54) METHOD AND SYSTEM FOR TRACKING STORAGE UTILIZATION

(71) Applicant: EMC IP Holding Company LLC, Hopkinton, MA (US)

(72) Inventors: Vamsi Vankamamidi, Hopkinton, MA (US); Xinlei Xu, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 16/942,919

(22) Filed: Jul. 30, 2020

(65) Prior Publication Data

US 2022/0035547 A1    Feb. 3, 2022

(51) Int. Cl.
*G06F 3/00*    (2006.01)
*G06F 3/06*    (2006.01)

(52) U.S. Cl.
CPC .......... *G06F 3/0644* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2005/0102481 A1* | 5/2005 | Sawdon | G06F 16/10 711/170 |
| 2021/0191663 A1* | 6/2021 | Bondurant | G06F 3/0652 |
| 2021/0216206 A1* | 7/2021 | Liu | G06F 3/0604 |

* cited by examiner

*Primary Examiner* — Midys Rojas
(74) *Attorney, Agent, or Firm* — Krishnendu Gupta; Deepika Bhayana; Derek Lam

(57) ABSTRACT

A method is used for tracking storage utilization in a storage system. An amount of physical storage space available for use on an appliance is determined. The amount of storage space consumed by each type of data being stored on the appliance is normalized. These normalized amounts are used to determine an amount of storage space on the appliance consumed by the data. When a percentage of storage space consumed on the appliance exceeds a threshold, an alert is generated.

19 Claims, 7 Drawing Sheets

---

Normalize amounts of storage space consumed, on an appliance, by each type of data to common protection level 505

↓

Normalize amount of storage space consumed by user data in accordance with its log structure 510

↓

Determine the amount of storage space being used on an appliance 515

↓

Determine the amount of storage space being used on a data storage system 520

300

| Appliance No. | Total physical storage | Physical storage used | % of storage used |
|---|---|---|---|
| 1 | 3.8 TB | 2.6 TB | 68% |
| 2 | 5.2 TB | 4.1 TB | 79% |
| 3 | 4.7 TB | 3.3 TB | 70% |
| System total | 13.7 TB | 10.0 TB | 73% |

FIG. 3

METHOD AND SYSTEM FOR TRACKING STORAGE UTILIZATION

BACKGROUND

Technical Field

This application relates to tracking storage utilization for a storage system.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The disk drive enclosures may be distributed among one or more appliances. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Additionally, data storage systems employ various techniques to assure high availability in the event of system failures. In one example, a storage device may experience a media error, in which stored data becomes corrupted and cannot be read from storage. In another example, the stored data may be tainted due to malfunction of the storage device, namely, the storage device may be writing to storage improperly and erroneously. To protect against possible data and/or metadata loss due to a physical drive failure, the data storage system can be configured such that at least some of its physical drives belong to a redundant array of independent (or inexpensive) disks (RAID) group, which is a storage device array created by logically binding a set of physical drives together. Such a RAID group can represent a logically contiguous address space distributed across a set of physical drives. Further, different RAID levels can be employed to provide varying degrees of fault tolerance for physical drive failures within the RAID group.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for tracking storage utilization in a storage system. The method includes determining an amount of physical storage space available for use on an appliance. The method also includes normalizing, for each type of data being stored on the appliance, an amount of storage space consumed by the type of data. The method also includes determining an amount of storage space on the appliance consumed by the data, based on the normalized amounts. The method also includes generating an alert when a percentage of storage space consumed on the appliance exceeds a threshold.

The method may display the amount of physical storage space on the appliance available for use and the amount of storage space on the appliance consumed by the data. The alert may provision additional storage space for the storage system, balance the load between the appliance and another appliance in the storage system, and/or transition the storage system into a write protection mode.

The method may determine the amount of physical storage space available for use on the appliance by reserving an amount of storage space equal to the largest data storage device on the appliance, configuring the remaining storage space on the appliance according to a protection level, and reserving storage space on the appliance for over-provisioning. The method may normalize the amount of storage space consumed by each type of data by normalizing an amount of storage space consumed by metadata to a common protection level, normalizing an amount of storage space consumed by user data in accordance with a log structure, or both.

The method may determine the amount of storage space on the appliance consumed by the data by summing the normalized amounts of storage space consumed by each type of data. The method may also include determining an amount of physical storage space available for use on the data storage system and an amount of storage space on the data storage system consumed by the data.

Another aspect of the current technique is a system, with a processor, for tracking storage utilization in a storage system. The processor is configured to determine an amount of physical storage space available for use on an appliance; normalize, for each type of data being stored on the appliance, an amount of storage space consumed by the type of data; determine an amount of storage space on the appliance consumed by the data, based on the normalized amounts; and generate an alert when a percentage of storage space consumed on the appliance exceeds a threshold. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which:

FIG. 3 depicts an exemplary graphical user interface that displays storage utilization metrics of the data storage system in FIG. 2;

DETAILED DESCRIPTION OF EMBODIMENT(S)

Described below is a technique for tracking storage utilization in a storage system, which technique may be used to provide, among other things, determining an amount of physical storage space available for use on an appliance; normalizing, for each type of data being stored on the appliance, an amount of storage space consumed by the type of data; determining an amount of storage space on the appliance consumed by the data, based on the normalized amounts; and generating an alert when a percentage of storage space consumed on the appliance exceeds a threshold.

Metrics regarding storage utilization of a data storage system enable the data storage system to be managed in response to its dynamic and projected needs. For example, when a data storage system has a cluster configuration that includes multiple appliances, a central controller may compare the metrics for the individual appliances and balance the load across them. The central controller may shift objects or tasks among the appliances until the storage utilization metrics for overloaded appliances drop to acceptable levels (e.g., below thresholds). In another example, when the storage utilization rate for one or more appliances, or the overall data storage system itself, exceeds certain thresholds, the central controller may generate alerts to the system administrators to provision more storage, or provision this additional storage automatically. Moreover, the central controller may track the amount of physical storage being used in a data storage system against the total amount of physical storage, and transition the data storage system into a write-protect mode when the storage utilization approaches or reaches 100%.

Because storage is deployed and consumed in a dynamic, heterogeneous nature, storage utilization may be challenging to represent in a usable and consistent manner. The total amount of physical storage in a data storage system changes when new storage devices are added and/or existing storage devices fail. Furthermore, different types of data may be subject to different levels of protection, thereby varying in the manner that they consume physical storage. Log structuring introduces another variation in how user data consumes physical storage, compared to other types of data. Thus, metrics for storage utilization of a data storage system must account for these different factors.

In at least some implementations in accordance with the techniques as described herein, the use of storage utilization measurement techniques in storage systems can provide one or more of the following advantages: real-time responsiveness to consumer demands for storage capacity, protection of data storage systems reaching full storage utilization capacity, and improved I/O latency for appliances due to load balancing.

Figure 1:
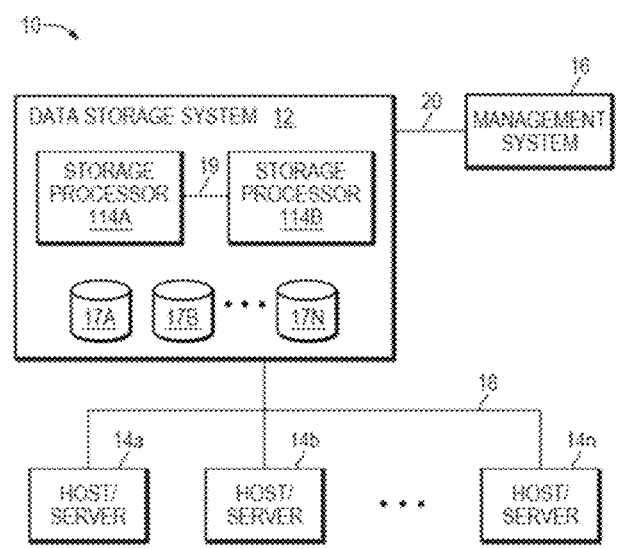
FIG. 1 depicts an example embodiment of a computer system that may be used in connection with performing the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
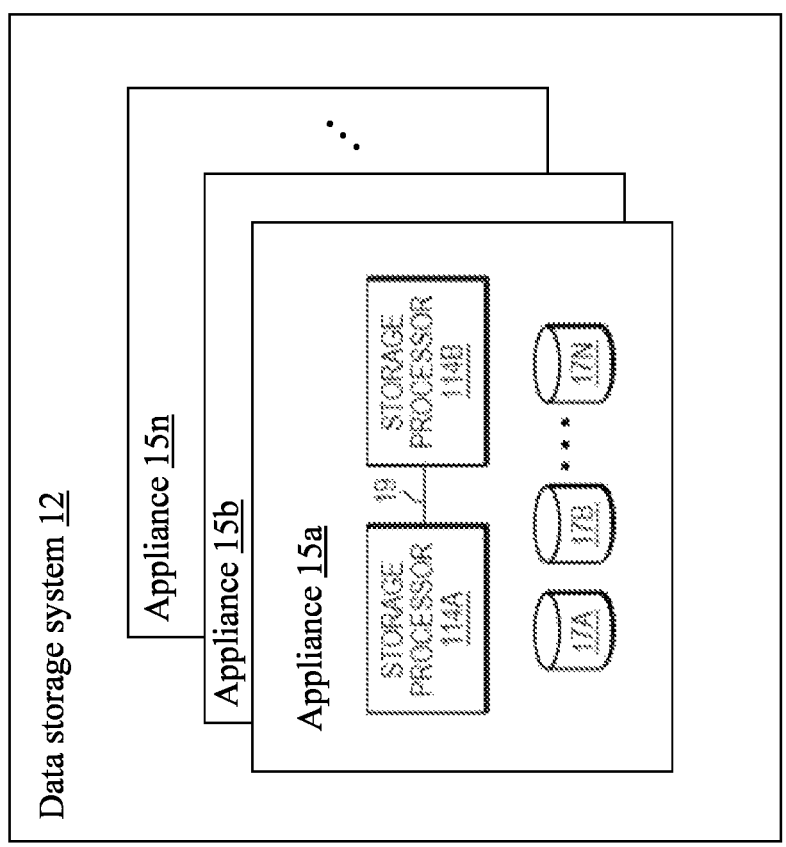
FIG. 2 depicts an exemplary embodiment of a data storage system used in the computer system 10 of FIG. 1.

FIG. 2 depicts an exemplary embodiment of a data storage system 12 used in the computer system 10 of FIG. 1. The data storage system 12 includes appliances 15a, 15b, . . . , 15n (individually and collectively, "15"), and each appliance 15 includes its own set of storage processors 114A, 114B and data storage devices 17a-17n.

FIG. 3 depicts an exemplary graphical user interface 300 that displays storage utilization metrics of the data storage system in FIG. 2. The management system 16 retrieves storage information from each appliance 15, and determines the total physical storage of each appliance 15, the amount of physical storage being used on each appliance, the total physical storage of the data storage system 12, and the amount of physical storage being used on the data storage system 12. The management system 16 displays these metrics on a graphical user interface 300, for a system administrator. In this example, the data storage system 12 includes three appliances 15, but the graphical user interface 300 may accommodate the number of appliances 15 for any alternate data storage system 12.

Figure 4:
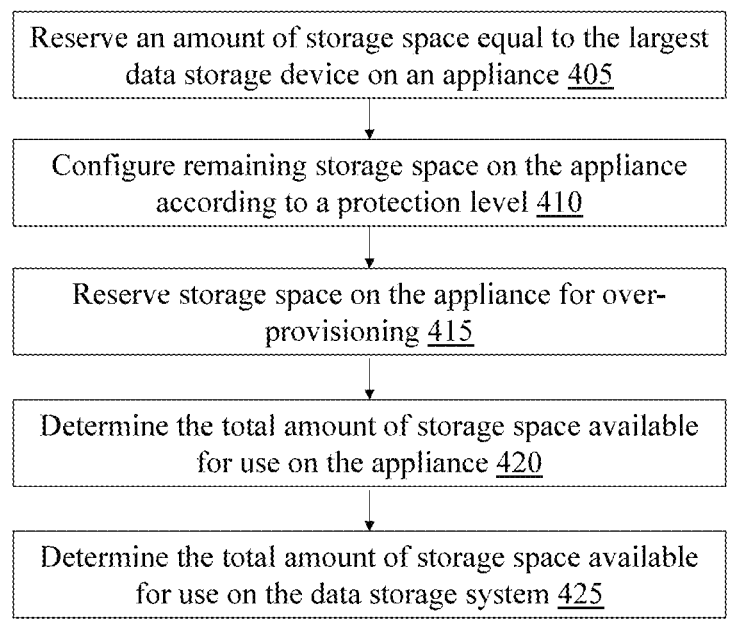
FIG. 4 is an exemplary flow diagram of a method for determining the total physical storage in a computer system available for use.

FIG. 4 is an exemplary flow diagram 400 of a method for determining the total physical storage in a computer system available for use. The management system 16 determines the amount of physical storage available on each appliance, and then sums these amounts to determine the amount available for the data storage system 12.

The management system 16 reserves an amount of storage space equal to the largest data storage device on an appliance 15 (step 405). In this manner, should one of the data storage devices 17 on the appliance 15 fail, the management system 16 can use the reserved storage to rebuild this device 17. The management system 16 configures the remaining storage space on the appliance according to a protection level (step 410). Because such configuration designates storage for redundancy (as in the case of mirroring), parity, or both, protection further reduces the amount of storage available for use. The management system 16 reserves storage space on the appliance for over-provisioning (step 415), which may be used to implement log-structured storage for user data. In various embodiments, the management system 16 reserves a set percentage of the remaining storage, such as 5%. The management system 16 determines the total amount of storage space available for use on the appliance (step 420). The management system 16 determines the total amount of storage space available for use on the data storage system 12 (step 425). In many embodiments, the management system 16 sums the amount of storage space available for use on each appliance 15 in the data storage system 12.

In one example, an appliance 15 has six data storage devices 17a, . . . , 17f. Each data storage device 17 has 1.0 terabyte (TB) of storage capacity. Because the largest capacity for a single data storage device 17 is 1.0 TB, the management system 16 reserves 1.0 TB as spare space, leaving 5.0 TB of remaining storage. The management system 16 may configure the data storage system 12 as a RAID 4+1 system, which reserves 1.0 TB of storage for parity. The management system 16 may reserve 5% of the remaining 4.0 TB, i.e., 200 GB, for over-provisioning, to implement log-structured storage for user data. Because 2.2 TB of the total 6.0 TB of storage has been set aside for spare space, parity, and over-provisioning, the remaining 3.8 TB of storage is available for use. The management system 16 may display this amount as the total physical storage available on the appliance 15, on a display such as the one depicted in FIG. 3.

In another example, an appliance 15 has twelve data storage devices 17a, . . . , 17n. Each data storage device 17 has 1.0 terabyte (TB) of storage capacity. Because the largest capacity for a single data storage device 17 is 1.0 TB, the management system 16 reserves 1.0 TB as spare space, leaving 11.0 TB of remaining storage. The management system 16 may configure the data storage system 12 as a RAID 8+2 system, which reserves 2.2 TB of storage for parity. The management system 16 may reserve 5% of the remaining 8.8 TB, i.e., 440 GB, for over-provisioning, to implement log-structured storage for user data. Because 3.64 TB of the total 12.0 TB of storage has been set aside for spare space, parity, and over-provisioning, the remaining 8.36 TB of storage is available for use. The management system 16 may display this amount as the total physical storage available on the appliance 15, on a display such as the one depicted in FIG. 3.

Furthermore, the data storage system 12 stores different types of data, such as user data, metadata, and boot data, each of which may be subject to different protection levels.

Additionally, due to log structuring and over-provisioning, user data consumes storage in a different manner than metadata and boot data. A meaningful metric of the physical storage being used must account for the variation in storage consumption among the types of data.

Figure 5:
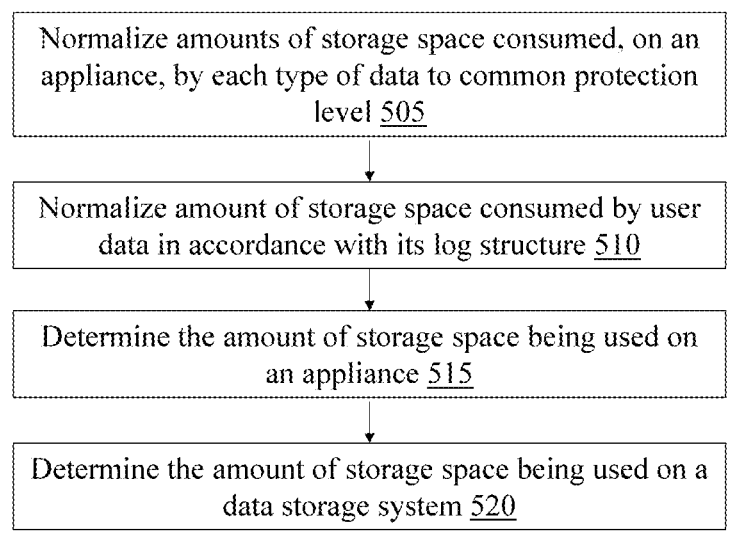
FIG. 5 is an exemplary flow diagram of a method for determining the physical storage in a computer system being used.

FIG. 5 is an exemplary flow diagram 500 of a method for determining the physical storage in a computer system being used. The management system 16 normalizes the amounts of storage space consumed on an appliance 15 by each type of data to a common protection level (step 505). In many embodiments, the metric for storage being used, as well as the total amount of storage available in an appliance 15, is based on the protection level for user data. Consequently, the storage consumed by metadata and boot data is normalized to this protection level. The management system 16 also normalizes the amount of storage space consumed by user data in accordance with its log structure (step 510). The management system 16 determines the amount of storage space being used on the appliance 15 (step 515). In many embodiments, this amount is the sum of the normalized values for storage space consumed by all of the types of data. The management system 16 determines the amount of storage space being used on the data storage system 12 (step 515), by summing the amounts being used by each appliance 15.

In one example, a data storage system 12 stores 4.0 TB of user data in a RAID 5 (4+1) configuration. The data storage system 12 also stores 1.0 TB of metadata and 500 GB of boot data, both according to a 1+1 mirror. Due to the mirroring, the 1.0 TB of metadata actually consumes 2.0 TB of physical storage, and the 500 GB of boot data consumes 1.0 TB. The 2.0 TB consumed by metadata is normalized to RAID 5 (4+1) according to the following formula:

$$2.0 \ TB \div (4/5) = 1.6 \ TB$$

The 1.0 TB consumed by boot data is normalized to RAID 5 (4+1) in a similar manner:

1.0 TB÷(4/5)=0.8 TB

Consequently, the amount of physical storage used by the metadata and boot data, normalized to RAID 5 (4+1) is 1.6 TB+0.8 TB=2.4 TB.

Because of the redundancy provided by RAID 5 (4+1), the 4.0 TB of user data consumes 5.0 TB of physical storage. However, because this amount is already determined according to RAID 5 (4+1), the storage amount for user data does not need to be normalized based on its protection level.

Figure 6:
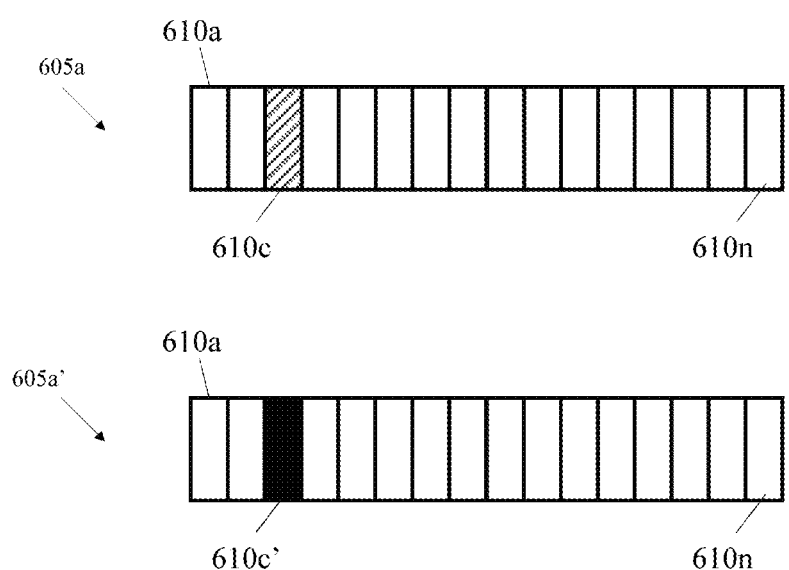
FIG. 6 is a schematic diagram illustrating how user data may be stored and overwritten on the pages of physical layer blocks (PLB), so as to demonstrate the statistics that may be tracked on physical storage usage.

However, this storage amount does need to be normalized due to the log structure of the user data. The management system 16 tracks statistics regarding the use of physical storage by the user data. FIG. 6 is a schematic diagram illustrating how user data may be stored and overwritten on the pages of physical layer blocks (PLB), so as to demonstrate the statistics that may be tracked on physical storage usage. In these diagrams, pages 610 storing valid data are marked in a hatched pattern, whereas pages 610 storing invalid data are marked in a solid pattern. Pages 610 available for storage of new data are unfilled with any pattern.

A physical layer block 605 includes a set of pages 610a, 610b, . . . , 610n. The data storage system 12 may receive a request to write data, which is initially saved to page 610c in the physical layer block 605, by way of example. When the data storage system 12 receives a subsequent request to overwrite the data on the page 610c, the data storage system 12 stores the new data on another page 610, whether in the same PLB 605 or another one. The data storage system 12 invalidates the page 610c', thereby creating a hole and marking the page 610c' for garbage collection.

As the data storage system 12 writes data to new pages 610 and invalidates previously written pages 610, each PLB 605 includes pages of stored data, pages of invalidated data, and/or pages available for storage of new data. The management system 16 tracks statistics regarding amounts of used and unused storage for each PLB 605, and further tracks such statistics for the storage on the appliance 15 dedicated to user data.

Figure 7:
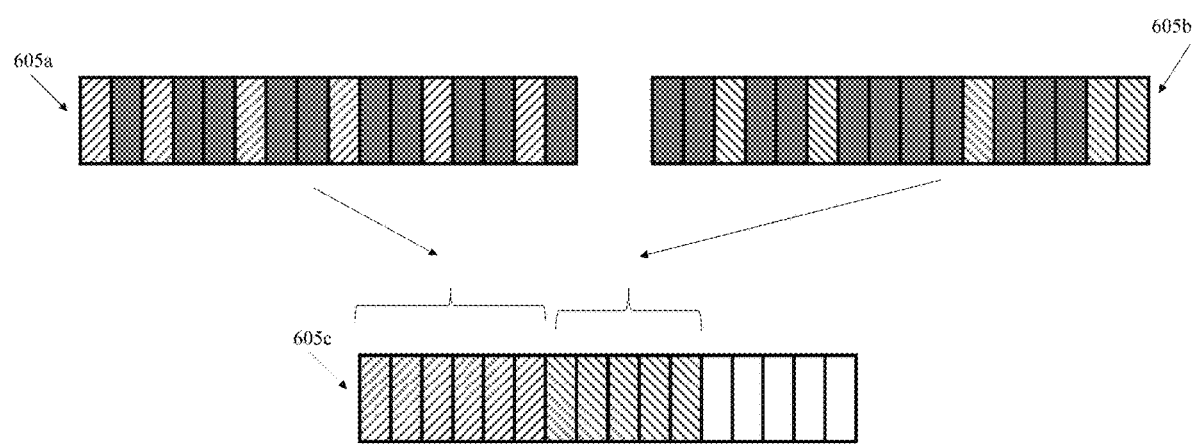
FIG. 7 is a schematic diagram illustrating how data on two PLBs with low utilization rates may be migrated to make more storage space available to use.

Additionally, in some embodiments, the management system 16 identifies pairs of PLBs 605 whose data can be merged into a single PLB 605. For example, the management system 16 may identify two PLBs 605a, 605b for which 50% or more of their pages consist of invalidated data. FIG. 7 is a schematic diagram illustrating how data on two PLBs 605a, 605b with low utilization rates may be migrated to make more storage space available to use. In this example, PLBs 605a and 605b include sixteen (16) pages each. PLB 605a stores 6 pages of valid data and 10 pages of invalidated data, whereas PLB 605b stores 5 pages of valid data and 11 pages of invalidated data. The management system 16 determines that both PLBs 605a, 605b are using less than 50% of their storage space for valid data.

The management system 16 may identify a third PLB 605c and migrate valid data from PLBs 605a, 605b thereto. Then, PLBs 605a, 605b may be marked for garbage collection, after which all of their pages 610 become available for storing new data. The management system 16 updates the statistics regarding used storage for the individual PLBs 605 and overall appliance 15 accordingly.

In this manner, the management system 16 normalizes the amounts of storage used by metadata and boot data according to the protection level of the user data, and normalizes the amounts of storage used by the user data in accordance with log protection. The management system 16 sums these normalized values to determine the amount of storage being used, and presents this value to the user on a graphical user interface.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for tracking storage utilization in a storage system, the method comprising:
   determining an amount of physical storage space available for use on an appliance, the appliance being configured to store data, wherein types of the data being stored include user data, metadata, and boot data;
   normalizing, for each type of data being stored on the appliance, an amount of storage space consumed by each type of data, the normalizing including:
   using a log structure to derive an amount of storage space actually consumed by the user data, wherein the log structure is configured to track pages storing valid data and pages storing invalid data, and the amount of storage space actually consumed by the user data is derived based on statistics tracked for the pages storing valid data and for the pages storing invalid data;
   using a redundancy protection level for a given type of data to derive an amount of storage space actually consumed by the metadata; and
   using the redundancy protection level for the given type of data to derive the amount of storage space actually consumed by the boot data;
   determining an amount of storage space on the appliance consumed by the user data, the metadata, and the boot data based on the derived amount of storage space actually consumed by the user data, the derived amount of storage space actually consumed by the metadata, and the derived amount of storage space actually consumed by the boot data; and
   generating an alert when a percentage of storage space consumed on the appliance exceeds a threshold.

2. The method of claim 1, further comprising:
   displaying the amount of physical storage space on the appliance available for use and the amount of storage space on the appliance consumed by the data.

3. The method of claim 1, wherein the alert provisions additional storage space for the storage system.

4. The method of claim 1, wherein the alert balances load between the appliance and another appliance in the storage system.

5. The method of claim 1, wherein the alert transitions the storage system into a write protection mode.

6. The method of claim 1, wherein determining the amount of physical storage space available for use on the appliance comprises:
   reserving an amount of storage space equal to the largest data storage device on the appliance;
   configuring the remaining storage space on the appliance according to the redundancy protection level; and
   reserving storage space on the appliance for over-provisioning.

7. The method of claim 6, wherein normalizing the amount of storage space consumed by each type of data comprises:
   for each type of data being stored on the appliance, deriving an amount of storage space actually consumed by the type of data based on the reserved storage space on the appliance for over-provisioning, spare space, and parity.

8. The method of claim 1, wherein determining the amount of storage space on the appliance consumed by the data comprises:
   summing the normalized amounts of storage space consumed by each type of data.

9. The method of claim 1, further comprising:
   determining an amount of physical storage space available for use on the data storage system and an amount of storage space on the data storage system consumed by the data.

10. A system for tracking storage utilization in a storage system, the system comprising a processor configured to:
    determine an amount of physical storage space available for use on an appliance, the appliance being configured to store data, wherein types of the data being stored include user data, metadata, and boot data;
    normalize, for each type of data being stored on the appliance, an amount of storage space consumed by each type of data; the normalizing including:
    using a log structure to derive an amount of storage space actually consumed by the user data, wherein the log structure is configured to track pages storing valid data and pages storing invalid data, and the amount of storage space actually consumed by the user data is derived based on statistics tracked for the pages storing valid data and for the pages storing invalid data;
    using a redundancy protection level for a given type of data to derive an amount of storage space actually consumed by the metadata; and
    using the redundancy protection level for the given type of data to derive the amount of storage space actually consumed by the boot data;
    determine an amount of storage space on the appliance consumed by the data, based on the normalized amounts of storage space actually consumed by the user data, the amount of storage space actually consumed by the metadata, and the amount of storage space actually consumed by the boot data; and
    generate an alert when a percentage of storage space consumed on the appliance exceeds a threshold.

11. The system of claim 10, wherein the processor is further configured to:
    display the amount of physical storage space on the appliance available for use and the amount of storage space on the appliance consumed by the data.

12. The system of claim 10, wherein the alert provisions additional storage space for the storage system.

13. The system of claim 10, wherein the alert balances load between the appliance and another appliance in the storage system.

14. The system of claim 10, wherein the alert transitions the storage system into a write protection mode.

15. The system of claim 10, wherein the processor is further configured to:
    reserve an amount of storage space equal to the largest data storage device on the appliance;

configure the remaining storage space on the appliance according to the redundancy protection level; and reserve storage space on the appliance for over-provisioning.

16. The system of claim 15, wherein the processor is further configured to:

for each type of data being stored on the appliance, derive an amount of storage space actually consumed by the type of data based on the reserved storage space on the appliance for over-provisioning, spare space, and parity.

17. The system of claim 10, wherein the processor is further configured to:

sum the normalized amounts of storage space consumed by each type of data.

18. The system of claim 10, wherein the processor is further configured to:

determine an amount of physical storage space available for use on the data storage system and an amount of storage space on the data storage system consumed by the data.

19. A non-transitory computer-readable storage medium having stored therein program code of one or more software programs, wherein the program code when executed by at least one processing device causes the at least one processing device to perform the following steps:

determining an amount of physical storage space available for use on an appliance, the appliance being configured to store data, wherein types of the data being stored include user data, metadata, and boot data;

normalizing, for each type of data being stored on the appliance, an amount of storage space consumed by each type of data, the normalizing including:

using a log structure to derive an amount of storage space actually consumed by the user data, wherein the log structure is configured to track pages storing valid data and pages storing invalid data, and the amount of storage space actually consumed by the user data is derived based on statistics tracked for the pages storing valid data and for the pages storing invalid data;

using a redundancy protection level for a given type of data to derive an amount of storage space actually consumed by the metadata; and using the redundancy protection level for the given type of data to derive the amount of storage space actually consumed by the boot data;

determining an amount of storage space on the appliance consumed by the user data, the metadata, and the boot data based on the derived amount of storage space actually consumed by the user data, the derived amount of storage space actually consumed by the metadata, and the derived amount of storage space actually consumed by the boot data; and generating an alert when a percentage of storage space consumed on the appliance exceeds a threshold.

* * * * *